April 25, 1967     N. SILBERTRUST ETAL     3,315,680
OPTICAL CAUTERIZER

Filed June 16, 1965     2 Sheets-Sheet 1

INVENTORS
NORMAN SILBERTRUST
NORMAN A. PEPPERS
BY Townsend and Townsend
ATTORNEYS April 25, 1967 N. SILBERTRUST ETAL 3,315,680
OPTICAL CAUTERIZER
Filed June 16, 1965 2 Sheets-Sheet 2
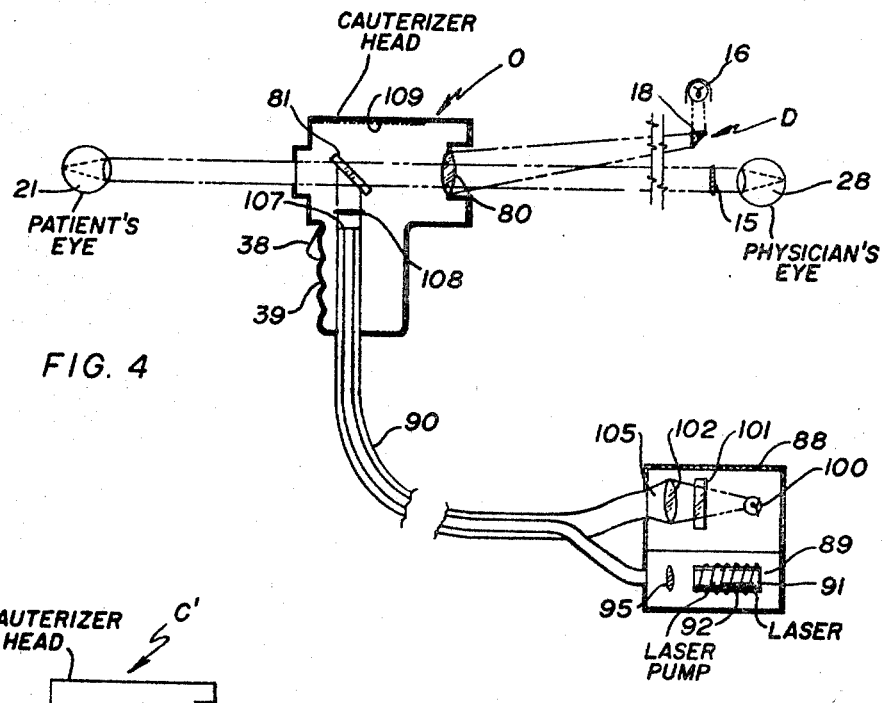
FIG. 4
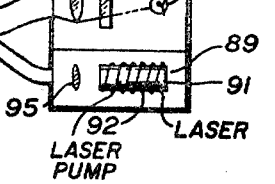
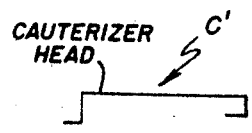
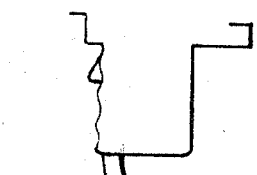
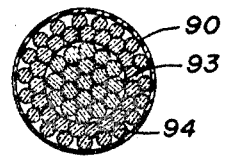
FIG. 3
FIG. 5
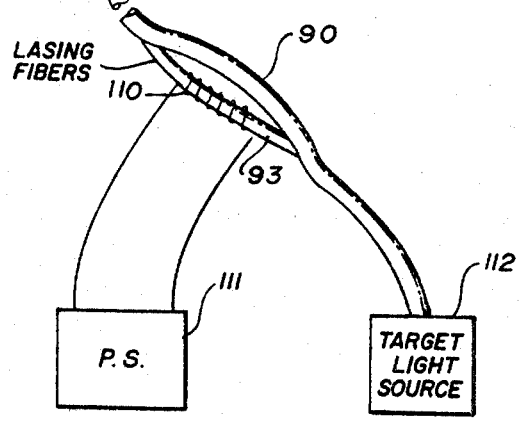
FIG. 6
INVENTORS
NORMAN SILBERTRUST
NORMAN A. PEPPERS
BY
Townsend and Townsend
ATTORNEYS

3,315,680
OPTICAL CAUTERIZER
Norman Silbertrust and Norman A. Peppers, San Carlos, Calif., assignors to Optics Technology, Inc., Palo Alto, Calif.
Filed June 16, 1965, Ser. No. 464,408
1 Claim. (Cl. 128—395)

This invention relates to a medical apparatus utilizing coherent light to effect cauterizing or similar effects. Photocauterizing is a technique wherein a high intensity optical radiation is applied to an area of the body in order to effect a controlled tissue burn.

The technique is often applied in medical applications to the eye for retinal and corneal treatments, and coherent light obtained from lasers or optical masers have successfully been employed to effect this purpose. The conventional laser or optical maser apparatus, however, previously employed optics in conjunction with the laser mechanism in which the operator or physician must look directly into the cauterizing instrument and through the optics required for the high intensity laser beam to effect viewing during treatment. Such devices inherently provide a high degree of magnification and a consequent low field of view. Present instruments employ a sole source of light which functions both as a target beam during treatment and as the vehicle for illuminating the retinal area which is in many cases inadequate for full viewing by the physician. The target light is arranged to project on the area to be treated as a target designating area at which the laser beam will be projected when applied and as such can not contribute greatly to overall illumination.

The present invention incorporates many of the features of previous devices but is arranged to provide the physician or operator with a broad field of observation and a separate source of illumination in addition to the target light which is used for positioning the point of impingement of the laser beam.

A further object of the invention is to provide the aforesaid improvements in a device of relatively light weight and sufficient mobility to allow the device to be hand held and aimed by the physician.

Another object of the invention is to provide a coherent light cauterizer employing mechanisms which will allow the physician to use the indirect method of ophthalmoscopy.

A still further object of the invention is to provide a coherent light cauterizer in which optical elements requiring relatively high power and high intensity light outputs are mounted at positions remote from the aiming and viewing device both by means of the use of relatively large objective optics and flexible fiber optics communicating cables.

A feature and advantage of this invention lies in the fact that the physician can carry the illuminating light and his individual eye pieces on his head in the convenient manner presently employed in indirect ophthalmoscopy and still employ the advantages of coherent light cauterization.

As a still further feature and advantage of this invention the target light can be formed of a relatively high intensity light source mounted remote from the operating element by means of a flexible fiber optics cable, whereby the target light can be of an intensity which is bright enough to be viewed even when the viewing light is simultaneously impinged upon the retinal area. This gives the physician the ability to examine the full retinal area both from an optical and an illumination standpoint while at the same time he can perceive the precise location at which the coherent light beam will be impinged because of the overriding target light.

A further feature and advantage of this invention lies in the fact that the physician can use bi-optical or stereoscopic viewing by the application of the dual eye lenses carried by the physician in which the viewing is acquired through a large objective lens thus giving the physician the advantage of bi-optical depth perception. At the same instance the viewing light also carried by the physician illuminates the entire area of the retina for more complete illumination.

As a still further feature and advantage of this invention both the target light and the coherent light source can be mounted remote from the operating element by the use of fiber optic cables which communicate both the target and the coherent light to the operating element for projection onto the eye. Thus, the operating element functions solely as a device for carrying the objective lens and the optics necessary to carry both the target light and the coherent light in an optical axis generally conforming with the optical axis of the objective lens.

A feature and advantage of this structure lies in the fact that the device can be completely mobile and of extremely light weight so that it can be aimed, positioned and held without the necessity of special stands and mounts.

Other objects, features and advantages of the present invention will be more apparent after referring to the following specification and attached drawings in which:

FIG. 3 is a cross-sectional view of the fiber optics used in conjunction with the embodiment of FIG. 2.

FIG. 4 is a cross-sectional view of an alternative embodiment of the invention.

FIG. 5 is a cross-sectional view of fiber optics adapted for employment in the embodiment of FIG. 4.

FIG. 6 is a schematic view of still another embodiment of the invention in which the fiber optics are formed of active lasing materials and the lasing action takes place within the fibers.

Figure 1:
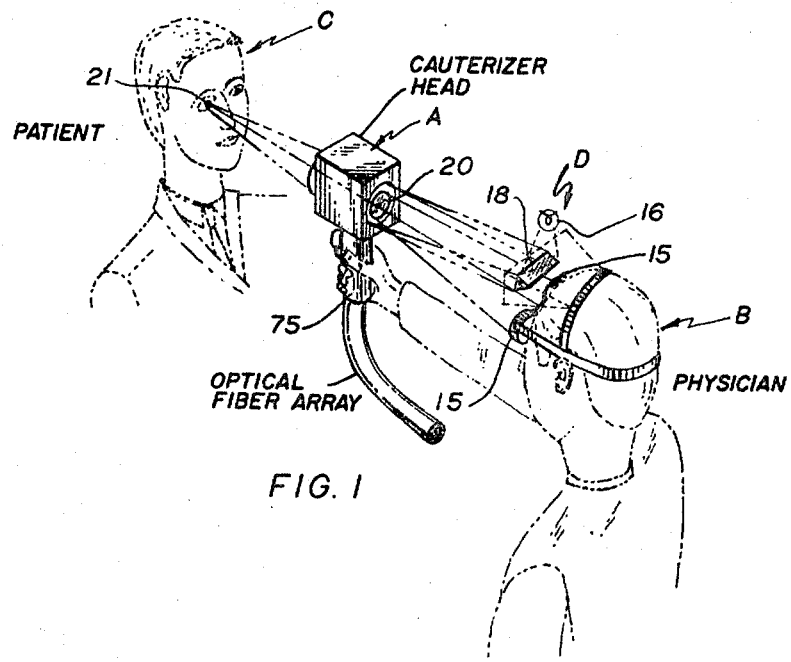
FIG. 1 is a perspective view showing a physician and patient with the cauterizer of the present invention being employed.

In the present invention a cauterizer head A is positioned between an operator or physican B and the patient C. The physician carries on his head an optical element D which carries eye lenses 15 and an illuminating light source 16 which projects the light from the light source through an objective lens 20 to the patient's eye 21. As seen in the principal embodiment of FIG. 2, the cauterizer head A comprises a housing 25 which mounts objective lens 20 and a dichroic mirror 26 within the optical path or axis between the physician's eye 28 and the patient's eye 21. The housing carries a lasing element 29 which include an active lasing element such as a ruby bar or rod 29 surrounded by a pump 30. Laser pump 30 is powered by a power supply 32 mounted remote from operating head A and connected by appropriate wires 35 for energization of pump 30. The power supply is controlled by a trigger switch 38 mounted on the handle portion 39 of head A. The laser beam formed within rod or bar 29 is reflected by a mirror 40 to a dichroic mirror 41 and thence to dichroic mirror 26 outwardly to the patient's eye 21. Thus, when trigger 38 is actuated, power source 32 is caused to provide a pulse to pump 30 which causes the laser bar 29 to lase and provide a pulse of high intensity coherent light directed to the eye 21. Aiming of the laser beam is accomplished through the employment of a target light source 45 mounted at a position remote from head A and in which the light from the target source is communicated by a fiber optics cable 46 to the dichroic mirror 41 for projection through the latter mirror to mirror 26 for subsequent reflection to eye 21 in precise axial alignment with the path of the laser beam. Thus, aiming of the laser beam is accomplished by merely positioning the target beam at the desired or control position. In this embodiment laser bar 29 is arranged to provide a coherent light beam in the order of 6943 A. Dichroic mirror 41 is arranged to be completely reflective to light within the 6943 A. range and transmissive to the greater percentage of all light within the wave length of target light from source 45. Target light 45 can be of a broad, full spectrum wave length or of a more selective wave length as might be determined by a filter 50 interposed between the lamp 51 and a condensing lens 52. In this manner substantially all the light from lamp 51 is directed through the dichroic mirror in a path between mirrors 41 and 26 in exact axial alignment with the laser beam. Mirror 26 is arranged to be completely reflective to light within the 6943 A. range, so that all the active or work light from laser 29 is reflected towards the patient's eye 21. Mirror 26 is also arranged to be approximately 50% transmissive and 50% reflective of light within the frequency range projected from the target light source 45, so that half the light will be projected onto the eye 21 in exact axial alignment with the coherent beam.

The fibers communicating the target light to the head A are formed of a plurality of fibers as seen in the cable array 46 of FIG. 3 in which each fiber is formed of a minute optical rod 60 having an outer sheathing or coating 61 having a lower index of refraction than the body of the fiber. As is well known in the fiber optics art, fibers of this character will communicate the light with extreme efficiency. Furthermore, fibers of this character are well known in the art to be flexible cables so that they can be bent within relatively functional radii. The input end of the fibers is mounted in communication with the light from lamp 51 through condensing lens 52. The distal or output end 65 of cable 46 is arranged to project onto a collimating lens 66 which collimates the beam from the fibers to dichroic mirror 41. The physician's eyepiece carries the two eye lenses 15, one mounted over each of the physician's eyes. Light source 16 of relatively high intensity is mounted above the physician's head and is reflected through mirror or prism 18 to objective lens 20. The prism is located as closely as possible to the optical between 12 and 35 diopter and is formed of relatively path between the patient's eye 21 and the physician's eye 28 so that the light emanates as closely as possible to the aforesaid axis. Objective lens 20 can be in the order of large diameter so that the light from source 16 will fall on objective lens 20 and pass therethrough to dichroic mirror 26. Light source 16 is of a wave length preferably in the broad visible wave length spectrums and as such, as previously described, will pass through mirror 26 at about 50% efficiency to illuminate eye 21. The image of the retina thus will return through dichroic mirror 26 and objective lens 20 to the eye pieces or lenses 15 for viewing by the physician. The inside of housing 25 immediately above dichroic mirror 26 is formed with a light absorber 70 which functions to absorb any of the laser beam which might inadvertently pass through the dichroic mirror 26. By this means the power of the laser will be dissipated by the absorber.

In operation of the device it can be seen that head A is completely flexible and can be made or fabricated relatively light in weight and small in size. Thus, the device can be hand held as indicated in FIG. 1, wherein the physician's hand 75 can grab the pistol grip 39. In this position the physician's finger can actuate trigger 38 to actuate the laser on demand. It can be seen that the path of the laser beam in no event can pass in any direction except towards the patient's eye, and thus the physician's eye is completely protected during operation of the device. It is noted that even though dichroic mirror 26 were to fail, the beam would be projected on the absorber 70 for harmless impingement. One of the important features in the invention lies in the fact that target lamp 51 is of an intensity to provide sufficiently bright light on the patient's eye 21 so as to be observed during the interval that viewing light 16 is simultaneously impinged upon the target eye 21. It is noted that even though dichroic mirror 26 is only 50% efficient, light from lamp 51 being remote from the unit can be arranged to provide all the light energy that is required to provide the aiming on eye 21. Filter 50 and lens 52 can be arranged to provide a target cross hairline projection if desired as well known in optical arrays. Furthermore, as is a well known characteristic of fiber optics, the imaginery of the target cross hairline will be transmitted through the minute fibers without substantial distortion. Alternatively, an aperture can be placed between distal end 65 and lens 66 so that the aiming pattern comprises a small spot. In this way, through proper registry, the center of the cross hairline or spot can be arranged to light on the exact position that the laser beam will impinge when activated. It can be seen therefore that with the present device the physician can obtain a broad field of view, such as in the neighborhood of 37% with the magnification of 2 to 4 times. At the same time the light level at the retina will be substantially high so that the physician can obtain both a broad field and high illumination of view with an aiming pattern superimposed on the illuminated field. As can further be seen, the bi-optical viewing apparatus of the physician through the objective lens 20 provides the stereoscopic or three-dimensional vision often necessary for optical examination.

Figure 2:
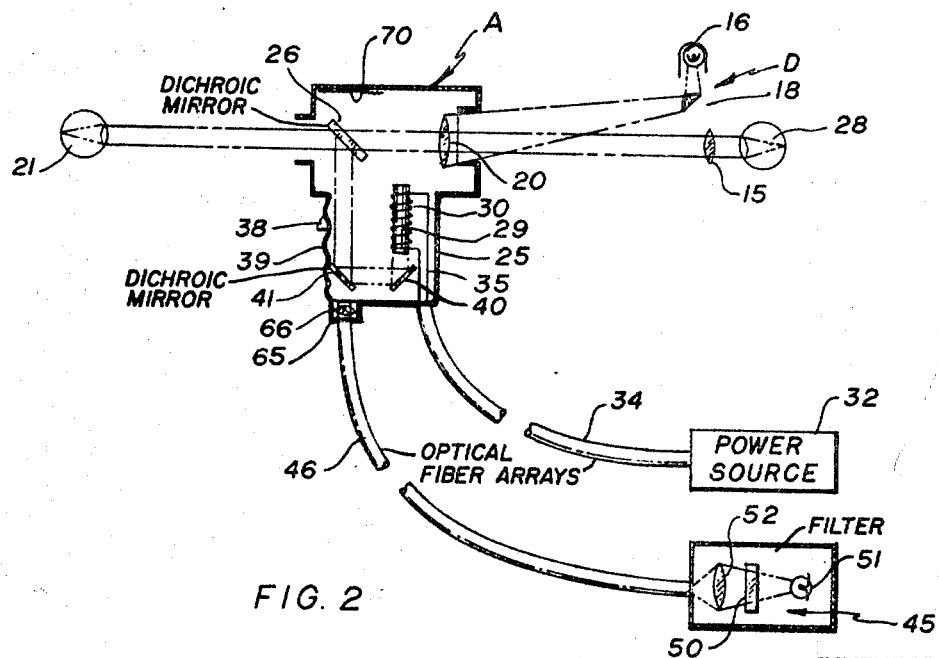
FIG. 2 is a cross-sectional view of a principal embodiment of the invention.

Referring now to FIG. 4, a cauterizer head O is arranged in which an objective lens 80 is arranged in the same manner as specified with respect to head A and which carries a dichroic mirror 81 formed in the same manner as mirror 26 previously described. The remainder of the head O in physical configuration including handle 39 and trigger 38 remains the same as specified in relation to head A. The physician employs the head O using a head piece D identical to that employed in use with head A and bearing identical reference numbers. In the embodiment of head O, however, both the target light 88 and the laser 89 are mounted remote from the head and are arranged to communicate the light energy to the head through a flexible fiber optics cable 90. Laser 89 in this case can be a conventional laser also including a ruby rod 91 and pump 92. Fiber optic cable 90 as seen in FIG. 5 is arranged with a central core of fibers 93 surrounded by a radial sheathing 94 of similar fiber structure. The core is connected with one end 95 in optical communication with the output of ruby bar 91 of laser 89. The target light source comprising a light bulb 100, a filter or cross hairline mask 101, and a focusing or condensing lens 102 is arranged to project the target light on one end 105 of the peripheral or radial sheathing 94 of the light cable. The distal end 107 of the cable is mounted within handle 39 adjacent to a collimating lens 108 for projection of the target light and coherent light from laser 89 onto the dichroic mirror 81 for reflection to the target eye 21. The housing also incorporates a light absorber 109 which functions identical to the light absorber 70 as shown in FIG. 2. It can be seen that the target light which completely surrounds the coherent work light will be in the same optical axis so that the target light will always show the exact position at which the cohered light will fall when activated. In this embodiment it can be seen that the operating housing carries no energizing elements as such and thus can be formed of extremely light weight. The mobility of the device is facilitated by the flexibility of the fibers which communicate the optical energy to the housing. In FIG. 6 there is a schematic view of a device incorporating a head C¹ which is identical to head O shown in FIG. 4. However, the fibers within the light pipe 90 at the center thereof at 93 are lasing fibers formed, for example, of neodymium doped glass. In this application the lasing action is acquired by forming a pump 110 around a portion of the flexible column which causes the lasing fibers 93 to lase through the pumping power obtained from power source 111. The target light is obtained from a target light source 112 which is identical to that shown at 88 in FIG. 4.

It can be seen in the device of the present invention that the physician is able, through the objective lens, to employ binocular vision of the eye and at the same time illuminate the eye through the illumination device carried by the physician in a manner identical to that normally employed in indirect ophthalmoscopy examinations. The positioning of the target beam and of the subsequent work laser or coherent light is then applied while observing the eye area through the wide field optics employed. At the same time the housing is of sufficiently light weight and has sufficient mobility so that it can be aimed, pointed, or moved in a manner analogous to the pointing of a gun to enhance the flexibility and control of the laser or work beam positioning.

While several embodiments of the present invention have been shown and described it will be obvious that other adaptations and modifications may be made without departing from the true spirit and scope of the invention.

What is claimed is:

Photocoagulator apparatus for use by a physician in conjunction with a head mounted light source and a head mounted biocular magnifying eyepiece, said apparatus comprising: a lightweight housing adapted to be handheld by the physician, said housing having a channel formed therethrough for defining an optical path, an objective lens mounted in the housing on the optical path and disposed for biocular viewing by the physician and for illumination by the head mounted light source, a plurality of flexible optical fibers having a first end attached to said housing and in light communication with said optical path obliquely thereof, said optical fibers forming a flexible optical energy conveying cable and having a second end remote from said housing, first means mounted in light communication with said second end for selectively exciting said optical fibers with coherent light energy, second means mounted in light communication with said second end for exciting at least some of said optical fibers with visible light energy having an energy level insufficient to damage eye tissue, means mounted in said housing within the optical path for deflecting light energy from the first end of the optical fibers along the axis of said path in a direction opposite from said objective lens, said deflecting mean being adapted to bidirectionally transmit only visible light along said optical path to afford illumination of a patient's eye by light directed on said objecting lens from the head mounted light source and creation of an image of the patient's eye on the objective lens, and means mounted in said housing for affording selective energization of said coherent light-exciting means by the physician.

References Cited by the Examiner

UNITED STATES PATENTS

| | | | |
|---|---|---|---|
| 2,825,260 | 3/1958 | O'Brien | 88—1 |
| 3,096,767 | 7/1963 | Gresser et al. | 128—395 |

ROBERT E. MORGAN, *Acting Primary Examiner.*

SIMON BRODER, *Examiner.*